(12) United States Patent
Gross et al.

(10) Patent No.: US 8,393,681 B2
(45) Date of Patent: Mar. 12, 2013

(54) VEHICLE SEAT HAVING AN ANTI-SUBMARINING DEVICE AND METHOD

(75) Inventors: Bernd Gross, Langenfeld (DE); Harald Mund, Linnich (DE)

(73) Assignee: Johnson Controls GmbH, Burscheid (DE)

( * ) Notice: Subject to any disclaimer, the term of this patent is extended or adjusted under 35 U.S.C. 154(b) by 267 days.

(21) Appl. No.: 12/306,129

(22) PCT Filed: Jun. 25, 2007

(86) PCT No.: PCT/EP2007/005594
§ 371 (c)(1),
(2), (4) Date: Jun. 2, 2009

(87) PCT Pub. No.: WO2007/147637
PCT Pub. Date: Dec. 27, 2007

(65) Prior Publication Data
US 2010/0001560 A1    Jan. 7, 2010

(30) Foreign Application Priority Data
Jun. 23, 2006    (DE) .......................... 10 2006 029 299

(51) Int. Cl.
*A47C 3/00* (2006.01)
*B60N 2/42* (2006.01)
(52) U.S. Cl. ............................... 297/284.11; 297/216.1
(58) Field of Classification Search ............... 297/216.1, 297/284.11
See application file for complete search history.

(56) References Cited

U.S. PATENT DOCUMENTS

| 6,082,817 | A  | 7/2000 | Mueller |
| 6,386,631 | B1 | 5/2002 | Matsuda |
| 6,450,573 | B1 | 9/2002 | Yamaguchi |
| 6,908,149 | B1 | 6/2005 | Yamaguchi |
| 7,413,246 | B2 | 8/2008 | Saiguchi |
| 2002/0053792 | A1 | 5/2002 | Yamaguchi et al. |

(Continued)

FOREIGN PATENT DOCUMENTS

| DE | 3841688 A | 6/1990 |
| DE | 19943595 A1 | 3/2001 |

(Continued)

OTHER PUBLICATIONS

PCT, International Search Report and International Preliminary Report on Patentability, International Application No. PCT/EP2007/005581, Jan. 22, 2009. (English translation).

(Continued)

*Primary Examiner* — Sarah B McPartlin
(74) *Attorney, Agent, or Firm* — Bill C. Panagos; Linda D. Kennedy; Butzel Long

(57) ABSTRACT

The invention relates to vehicle seat comprising a seat part and to a restraint device and a corresponding method of manufacture. The vehicle seat comprises an anti-submarining restraint device for preventing an occupant from slipping through on the vehicle seat when decelerated due to a crash, said restraint device being settable to a retracted inactive position and said restraint device being settable to an extended active position. The seat part, in the longitudinal direction of the vehicle, has lateral seat parts on both sides of the seat, a padding defining a seat area and a padding support below said padding. The restraint device is arranged between the padding support and the padding and spaced apart from the lateral parts by means of a locking element provided for locking the restraint device in the active position.

7 Claims, 14 Drawing Sheets

U.S. PATENT DOCUMENTS

Figure 1:
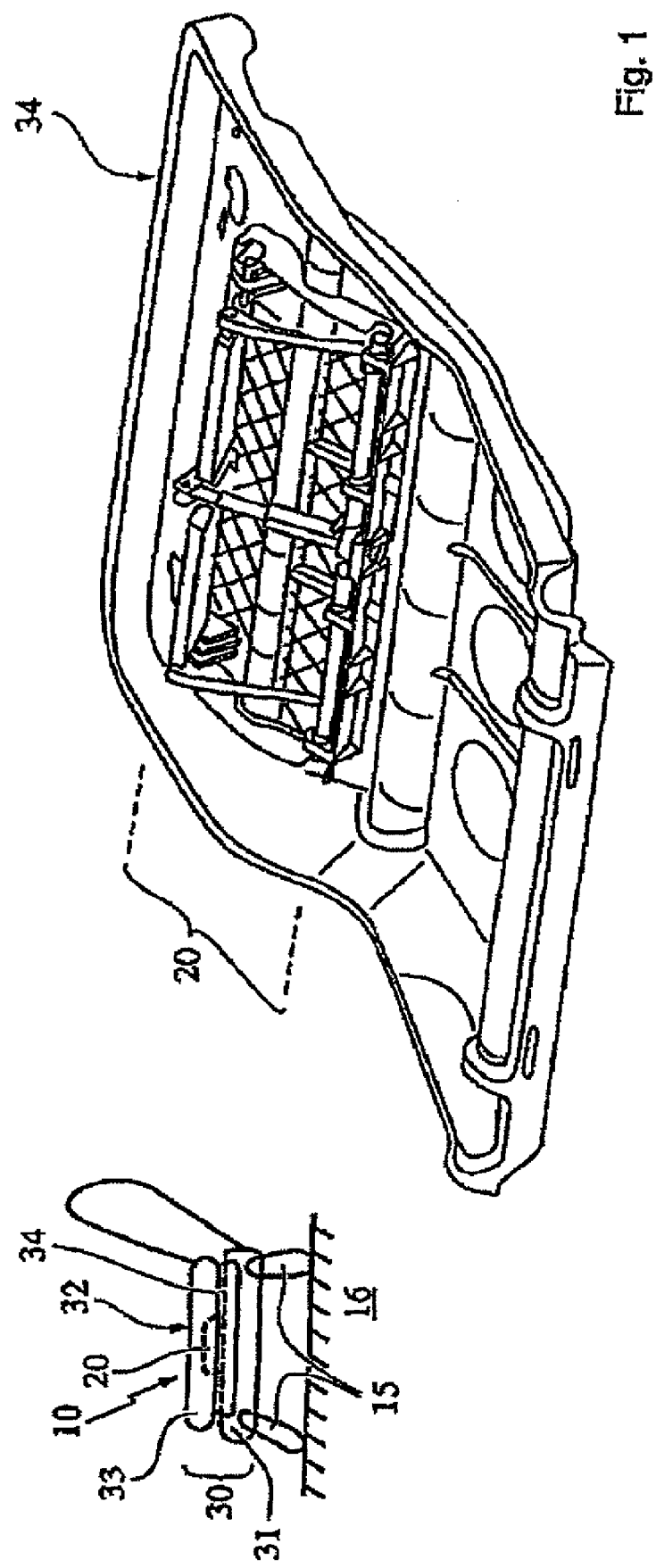

| | | |
|---|---|---|
| 2003/0227213 A1 | 12/2003 | Yamaguchi |
| 2004/0055806 A1 | 3/2004 | Masuda et al. |
| 2004/0222680 A1 | 11/2004 | Freisler et al. |
| 2006/0125296 A1 | 6/2006 | Hippel et al. |

FOREIGN PATENT DOCUMENTS

| | | |
|---|---|---|
| DE | 10231794 A1 | 2/2004 |
| DE | 10320967 A1 | 11/2004 |
| DE | 10340996 B3 | 3/2005 |
| DE | 102004019221 | 10/2005 |
| DE | 102004019221 A1 | 11/2005 |
| EP | 1199214 A2 | 4/2002 |
| EP | 1378391 A | 1/2004 |
| JP | 2000272396 | 10/2000 |
| JP | 2004034797 | 2/2004 |
| JP | 200606520 | 3/2006 |
| WO | 2004030980 A | 4/2004 |
| WO | WO 2005/023581 | 3/2005 |
| WO | 2007147634 A2 | 6/2007 |

OTHER PUBLICATIONS

PCT, International Search Report and International Preliminary Report on Patentability, International Application No. PCT/EP2007/005594, Jan. 22, 2009. (English translation).

PCT, International Search Report and International Preliminary Report on Patentability, International Application No. PCT/EP2007/005593, Jan. 22, 2009. (English translation).

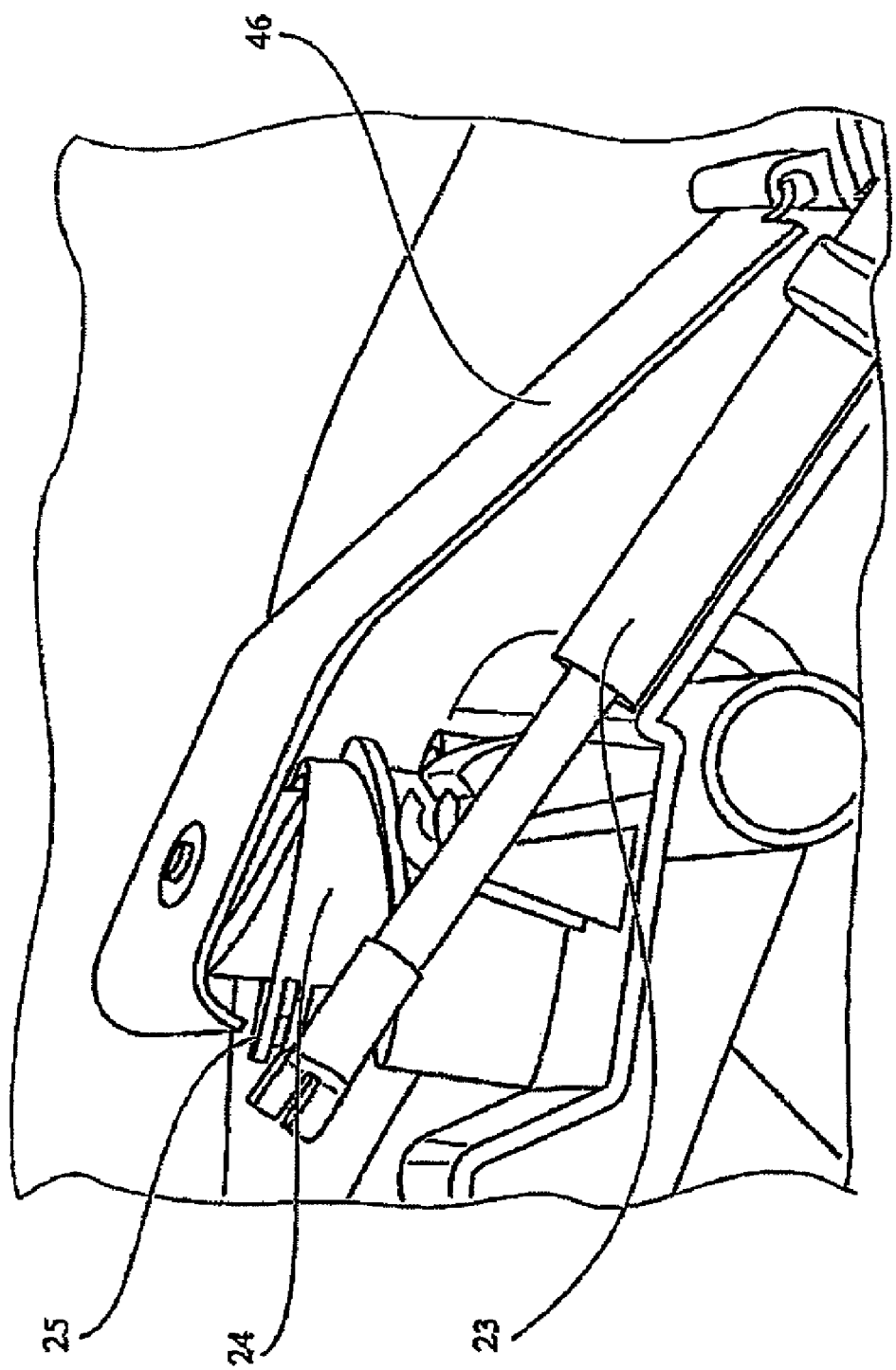

VEHICLE SEAT HAVING AN ANTI-SUBMARINING DEVICE AND METHOD

CROSS-REFERENCE TO RELATED APPLICATIONS

The present application is a National Stage filing and claims priority to International Application No. PCT/EP2007/005594, filed Jun. 25, 2007, entitled "VEHICLE SEAT COMPRISING A SEAT PART AND AN ANTI-SUBMARINING RESTRAINT DEVICE, RESTRAINT DEVICE AND METHOD OF MANUFACTURE" which claims priority to German Patent Application No. DE 10 2006 029 299.5 filed Jun. 23, 2006, the entire disclosures of which are incorporated herein by reference.

The present invention relates to a vehicle seat with a seat section and with a restraint device for preventing submarining of a passenger on the vehicle seat during an accident-induced deceleration, wherein the restraint device can be set in a retracted inactive position, and wherein the restraint device can be set in an extended active position, wherein the seat section has a padding, which defines a seat surface, and a padding support which is provided beneath the padding.

Such vehicle seats are generally known. For example, a motor vehicle seat with a seat surface on the surface of a padding is known from German laid-open specification DE 102 31 794 A1, wherein a seat pan is provided beneath the seat surface, and wherein between the seat pan and the seat surface of the seat section a U-shaped adjusting element is arranged, which in the case of a crash can be moved out from an initial position in such a way that the seat surface and the adjusting element counteract a forward displacement in the longitudinal direction of the vehicle of the pelvis of a person sitting on the seat surface. With this vehicle seat, the adjusting device is, for example, of U-shaped design and is coupled by both end portions to the side regions of the vehicle seat. This has the disadvantage that for realizing an active restraint device for preventing submarining of a person sitting on the vehicle seat (a so-called anti-submarining restraint device), i.e. a restraint device which can be transferred from an inactive to an active extended position, it is provided that the restraint device, during assembly of the vehicle seat, must be connected to structural elements of the vehicle seat, such as seat side sections or a seat section frame or the like, as a result of which there is no modularity in the sense of the possibility of deciding only at a late stage of the seat production or of the seat completion whether the vehicle seat is to be equipped with a restraint device or not. In the case of known vehicle seats, therefore, a larger number of variants of the vehicle seat have to be taken into consideration over a larger part of the production chain of the vehicle seat, which altogether leads to higher cost in the case of logistics and production. A vehicle seat with a seat frame, a seat cushion and a seat cushion support is known from German laid-open specification DE 199 43 595 A1, wherein in the longitudinal direction an anti-submarining ramp is attached approximately in the middle of the seat padding support, extends to the front edge of the seat padding support and covers approximately the front half of the seat padding support. A normally folded-up airbag, which is inflated in the event of a crash, is provided between the ramp and the seat padding support, or is embedded in the ramp. However, an airbag of this type is comparatively expensive, and therefore the known vehicle seat is overall comparatively costly.

The present invention is therefore based on the object of providing a vehicle seat with a restraint device for preventing submarining of a passenger on the vehicle seat in the case of an accident-induced deceleration, wherein the vehicle seat for one thing can be equipped with such a restraint device easily and simply with the least possible cost and as late as possible in the production chain of the vehicle seat, and wherein for another thing the restraint device is equipped in such a way that the restraint device can be connected particularly simply, but nevertheless securely to the vehicle seat.

The object is achieved by means of a vehicle seat with a seat section and with a restraint device for preventing submarining of a passenger on the vehicle seat, wherein the restraint device can be set in a retracted inactive position, and wherein the restraint device can be set in an extended active position, wherein the seat section, in the longitudinal direction of the vehicle, has side sections on both sides, wherein the seat section has a padding which defines a seat surface, and a padding support which is provided beneath the padding, and wherein in addition the restraint device is arranged between the padding support and the padding and also at a distance from the seat side sections, and wherein the restraint device is fastened exclusively to the padding support. As a result of this, it is possible in a particularly simple manner that the modularity of the restraint device is ensured, i.e. the possibility of deciding only at a late point in time in the production chain of the vehicle seat whether a specific vehicle seat is to be equipped with a restraint device according to the invention or not. According to the invention, it is particularly preferred that the restraint device can be fastened to the padding support by pushing on and/or by sliding on and/or by clipping and/or by adhesive fastening. With this means, the restraint device can be fastened to the padding support in a particularly simple and rapid manner and, nevertheless, a secure connection can be ensured. In the sense of the present invention, a padding support is understood to be a single structural component or a multiplicity of structural components of the seat section, which are provided at least in the proximity of the padding which is possibly to be fastened later on the seat, and which retain or support the padding. For example a padding support which continues essentially over the entire seat surface, as an essentially universal cushion pan or seat pan is a possibility as a padding support in this case. Furthermore, according to the invention, for example a so-called split seat pan or divided seat pan is a possibility, in which such a split seat pan supports approximately the front half or only the front or rear approximately 20% or just 10% of the padding. Furthermore, structural elements such as tubular or open stiffening elements are also a possibility as part of the padding support. In the case of a padding support in the sense of the present invention this can also partially have an underspringing.

According to the invention, it is especially preferred if the restraint device has an actuating means, especially a pyrotechnic linear actuator and/or a reversibly operating actuator, wherein the actuating means is arranged between the padding support and the padding, or is supported between the padding support and the padding, wherein in particular an operation of the actuating means is already provided in terms of time before the existence of an accident-induced deceleration. In the case of supporting the actuating means between the padding support and the padding, the actuating means can partially also extend or be arranged beneath the padding support. Linear actuators are comparatively small and can be realized in a compact manner in terms of installation space, so that as a result of this the restraint device can be configured in an especially compact manner in terms of installation space and according to the invention the modularized installation method of the restraint device in the vehicle seat can be especially easily realized. According to the invention, for example a pyrotechnic linear actuator, also a reversibly operating actuating means, for example an electric motor-powered linear actuator, can be provided alternatively or cumulatively to an irreversibly operating actuating means and together with corresponding sensors (pre-crash sensors) which anticipate an accident, leads to a setting of the extended active position of the restraint device or to a setting of an intermediate position of the restraint device (between the inactive position and the active extended position) already before an accident occurrence in terms of time and therefore before the existence in terms of time of an accident-induced deceleration (i.e. a deceleration which is typical for an accident occurrence).

Furthermore, it is preferred if the restraint device has a positioning element which is movable by the actuating means, wherein the positioning element is adjustable by means of the actuating means from a retracted position which corresponds to the inactive position of the restraint device into an extended position which corresponds to the active position of the restraint device. As a result of this, it is possible that the positioning element can be optimized to the respective application case independently of the actuating means, for example with regard its compressibility (for example for energy dissipation during an accident situation), or also with regard to its dimensions which in their turn for example have an influence on the extension degree of the restraint device.

Furthermore, it is preferred that a rotation around an axis which extends essentially horizontally and especially transversely to the direction of the vehicle is provided between the retracted position and the extended position of the positioning element, wherein the positioning element is preferably provided as a plate-form positioning element, and wherein the rotation around the essentially horizontally extending axis is preferably provided as a rotation in the direction of travel. As a result of this, a plate can be used as the positioning element which extends essentially over the entire width of the restraint device which can preferably be installed in a modular manner, wherein the plate in the retracted position of the positioning element is arranged essentially parallel to the seat surface or parallel to the padding support, and in the extended position of the positioning element is arranged essentially perpendicularly to the seat surface or perpendicularly to the padding support. Between the positioning element and the padding of the seat section, according to the invention there is preferably a cover of the restraint device in the sense of an anti-submarining ramp. As a result of this, it is advantageously ensured that the body of the seat's occupant in the case of an accident situation (i.e. a negative acceleration or a deceleration, which exceeds a prespecified limiting value) exerts a force action upon the restraint device over the largest possible area so that the risk of injury of the seat's occupant is lessened. A particular advantage of a movement of the positioning element in the direction of the vehicle is that the force action of the actuating means, especially a pyrotechnic linear actuator, can be selected in such a way that the force action of the actuating means or its extension in any case is not directed in the direction of main body parts (especially in the direction of the pelvis or in the direction of the trunk) of the seat's occupant. As a result of this, the risk of injury is likewise reduced.

According to the invention, it is additionally preferred that a rotation at least of a part of the positioning element around an axis, which extends essentially vertically, is provided between the retracted position and the extended position of the positioning element, wherein the positioning element is preferably provided as a telescopically extendable positioning element with one or more extendable elements. As a result of this, it is advantageously possible that the positioning element can be realized in a compact type of construction, for example by means of cup-like components which telescopically inter-engage, and for realizing the extended position from the retracted position a rotational movement of at least one of the cup-like components around its center is carried out. In this case, a spirally designed pin-and-slot guide of the at least two cup-like components is preferably provided according to the invention for converting the rotational movement into an extending movement. For realizing a locking of such a positioning means, the pin-and-slot guide can be configured by means of an asymmetrical toothing in such a way that only a movement in the direction of the extending movement is possible. Alternatively to an exemplary pin-and-slot guide, in the case of the telescopically extendable variant of the positioning element it can also be provided according to the invention that for example two cup-like components inter-engage like a thread and by means of a rotation of one of these components relative to the other a positioning is brought about.

Furthermore, it is preferred if the restraint device has a lower section and an upper section, wherein the lower section has fastening elements for connecting the restraint device to the padding support, or if the padding support has fastening elements for connecting the restraint device to the padding support. As a result of this, it is possible in a simple manner to create the connection between the restraint device and the padding support without expensive tools being required for it or without the task making high qualification demands. In this case, according to the invention a fastening by pushing on, or sliding on, or clipping, or adhesive fastening have proved to be especially preferable. Combinations of two or more such fastening possibilities can also be used, for example for securing a push-on connection or a slide-on connection. Alternatively to the embodiment variant of the restraint device with a lower section and an upper section, it can also be provided according to the invention that the functionality of the lower section (for example the provision of connecting points of levers or the like) is undertaken by the padding support (full integration of the lower section into the padding support) and that consequently the lower section can be saved so that the weight can be reduced and costs can be saved. For example, it is provided in this case that the restraint device, that is to say for example lever connections or the like of the restraint device, are screwed and/or riveted and/or pinned to the lower section.

Furthermore, it is preferred if the restraint device has a locking means, wherein the locking means is preferably provided in a moveable manner by means of the movement of the positioning element, wherein, in particular, the locking means has a slot and a bolt, wherein the bolt has an axial first section with reduced diameter, and an axial second section with enlarged diameter, and wherein an axial movement of the bolt is provided for bringing about the locking. As a result of this, it is advantageously possible according to the invention that a modular type of construction of the locking means can be provided in such a way that the blocking force of the locking means can be set largely independently of the other characteristics of the restraint device. For example, it is possible according to the invention that a drag lever on its end opposite the positioning element is guided in a housing which accommodates a multiplicity of spring-loaded latching bolts which in the retracted position of the positioning element press upon the drag lever. As soon as the drag lever has extended far enough in the direction of the extended position of the positioning element, one of the latching bolts locks the return movement of the drag lever. By a multiplicity of such latching bolts a multiplicity of engaged positions can be defined. This is especially advantageous in case (on account of malfunction of the actuating means or on account of the particular situation of a seat occupancy for example by an abnormally large or an abnormally small person as the seat occupant) a movement of the positioning element into its furthermost extended position is not carried out. A further embodiment variant of the restraint device for alternative realization of a locking means, according to the invention can provide a slot with a starting section and with an end section, wherein a bolt, which is moved together with the positioning element, engages in the slot, wherein the bolt in the inactive position of the restraint device is located in the starting section of the slot, and in the active position of the restraint device is located in the end section of the slot, and wherein the shape of the slot is configured in such a way that at least in the (fully) activated position, or active position, of the restraint device a reverse movement of the positioning element or of the bolt is prevented. In this case, the slot, according to a further variant of the locking means, can have for example a curvature or a bend point in such a way that the bolt which is moved with the positioning element can no longer be moved back into the starting section, or such a reverse movement is highly improbable, on account of the force ratios which exist in an accident situation. Furthermore, in a further variant an operating cam, also with a starting section and an end section for a bolt, can be provided instead of the slot, wherein the operating cam has a recess in the end section in such a way that the bolt which is moved with the positioning element likewise can no longer be moved back into the starting section, or such a reverse movement is highly improbable, on account of the force ratios which exist in an accident situation. In this case, it can preferably be provided that the element or component which features the operating cam is spring-preloaded in the direction of the inactive position. In the case of the embodiment variants with a slot, it can be advantageously provided in the same way that the element or component which features the slot is spring-preloaded in the direction of the inactive position. Furthermore, in a further variant, a slot, in a way in which it is configured in the style of a keyhole, can be formed with a starting section which has a reduced clear opening, and an end section which has an enlarged clear opening, in such a way, and interacting with a bolt, that the bolt has a smaller diameter in a first axial section and interacts with the starting section, and that the bolt, upon reaching the end section of the slot (which is to be carried out during a movement of the positioning element in the direction of the active position), with a second axial section of the bolt, which has a larger diameter, is pressed into the end section on account of a spring-pretensioning of the bolt. In a further embodiment variant of the restraint device, for alternative realization of a locking means, according to the invention the positioning element can interact with the upper section, especially with holes or recesses, in such a way that upon reaching the active position a reverse movement of the positioning element is prevented. According to the invention, it is furthermore provided that partial aspects of the different variants of the restraint device with a locking means can be combined with each other. In this way, for example the last-mentioned variant (holes or recesses in the positioning element) can be combined with the other variants.

Further subjects of the present invention relate to a restraint device according to the invention for a vehicle seat, and also to a method for producing a vehicle seat according to the invention, wherein in a first step the supporting structure of the vehicle seat is produced, and wherein in a second step the restraint device is connected to the padding support. As a result of this, it is especially possible that the complete production steps for producing the structural elements of the vehicle seat, for example the frame of the seat, the frame of a back section, the sub-construction of the seat section and the like, are carried out in the first production step and for example are undertaken in the factory of the seat section manufacturer. The integration of the restraint device into the vehicle seat, or with the seat section of those vehicle seats which are to be equipped with the restraint device, can then be undertaken in a production plant in the proximity of the final production of the vehicle seat or of the vehicle in which the vehicle seat is to be installed, wherein for this installation of the restraint device in the vehicle seat according to the invention there are significantly lower equipping requirements and furthermore significantly less qualification requirements of the employees who carry out the installation than for the production of the structural elements of the vehicle seat for which for example the production of welded joints is necessary.

Exemplary embodiments of the invention are shown in the drawing and explained in more detail in the following description.

FIG. 1 schematically shows a side view of a vehicle seat according to the invention, and also shows a perspective view of a seat pan or of a padding support of a seat section of a vehicle seat according to the invention with a partially sectioned view of a restraint device according to the invention.

Figure 1A:
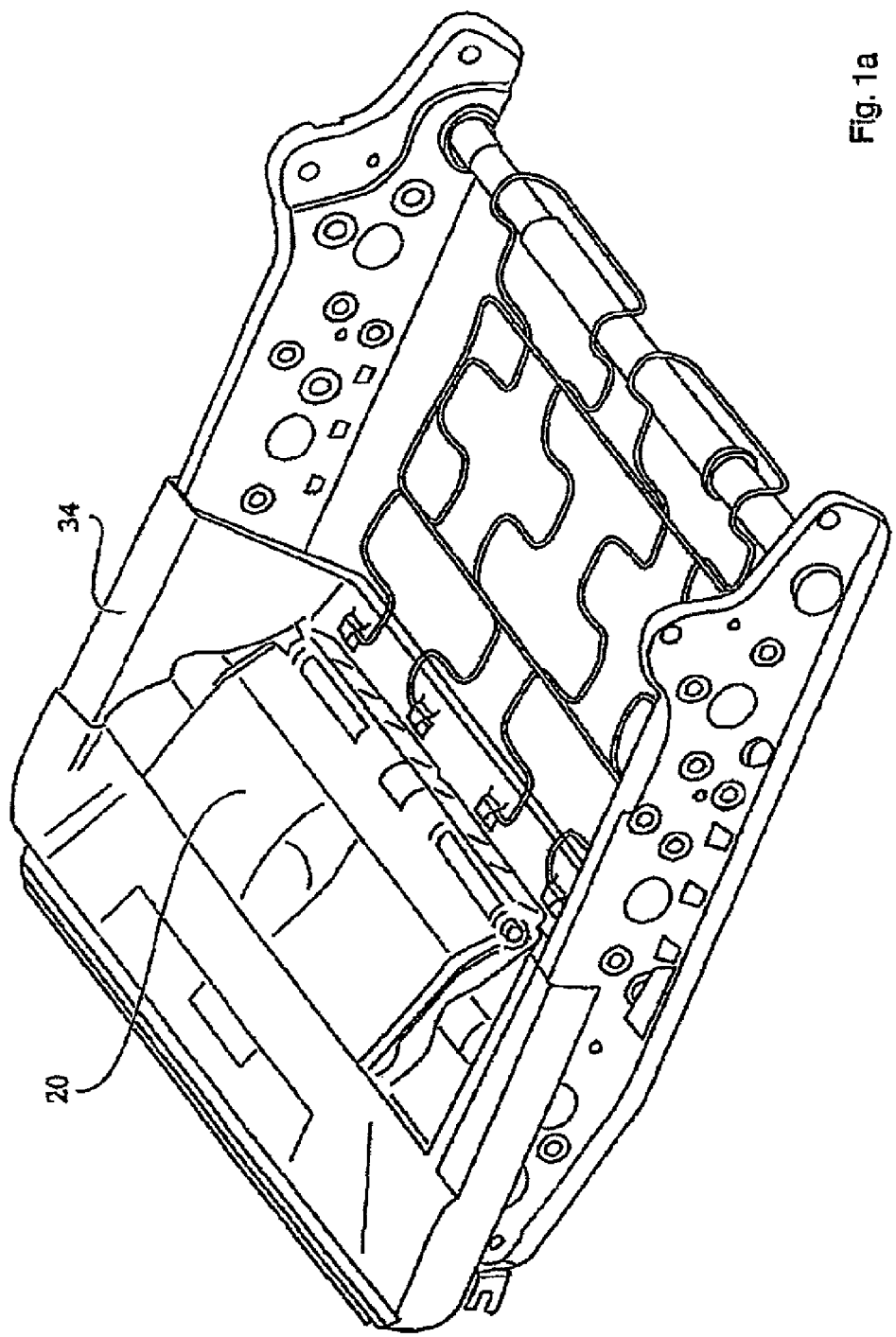
Figure 1B:
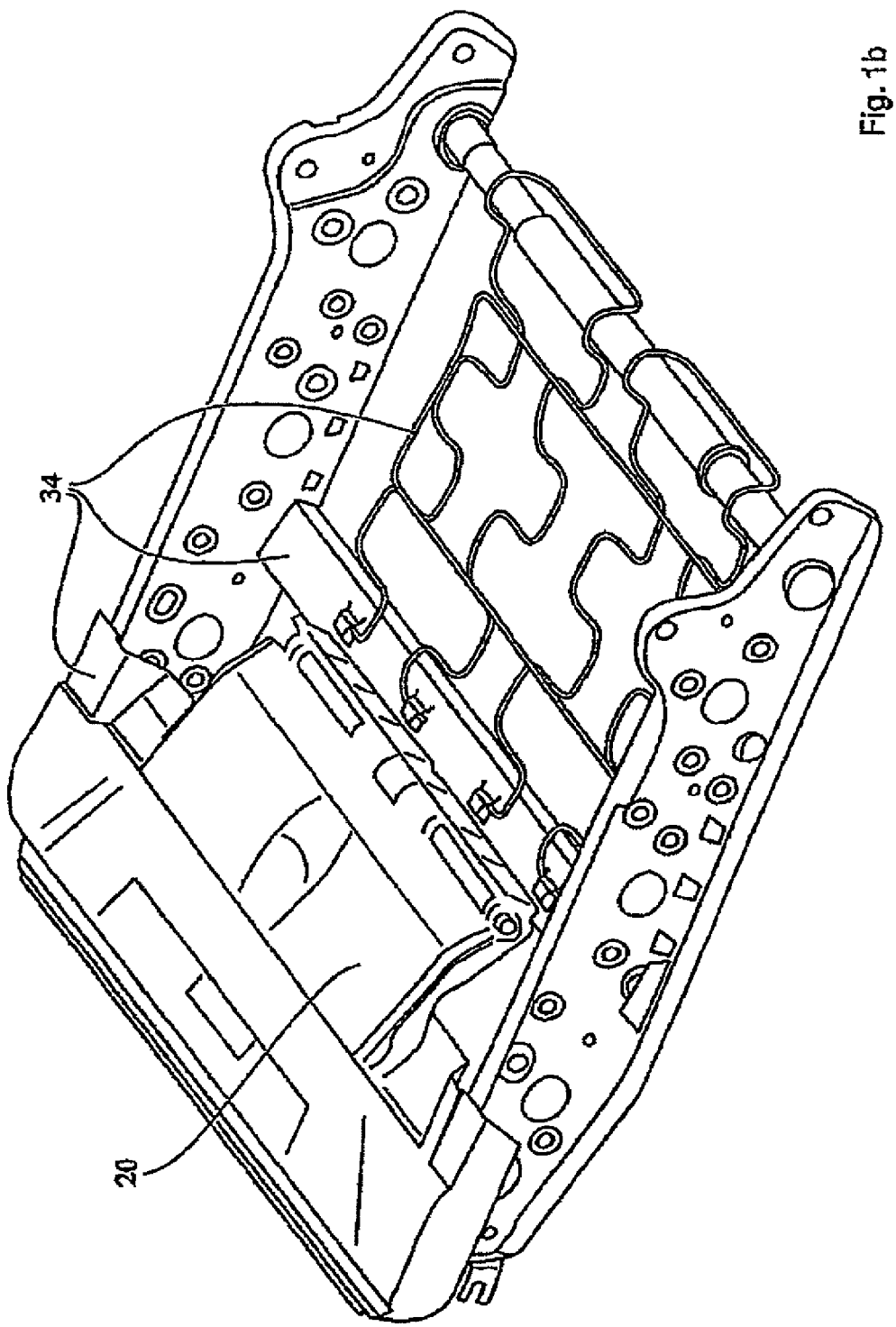

FIGS. 1a and 1b schematically show perspective views of different embodiments of a padding support of a seat section together with the seat side sections of the seat section and the restraint device.

Figure 2:
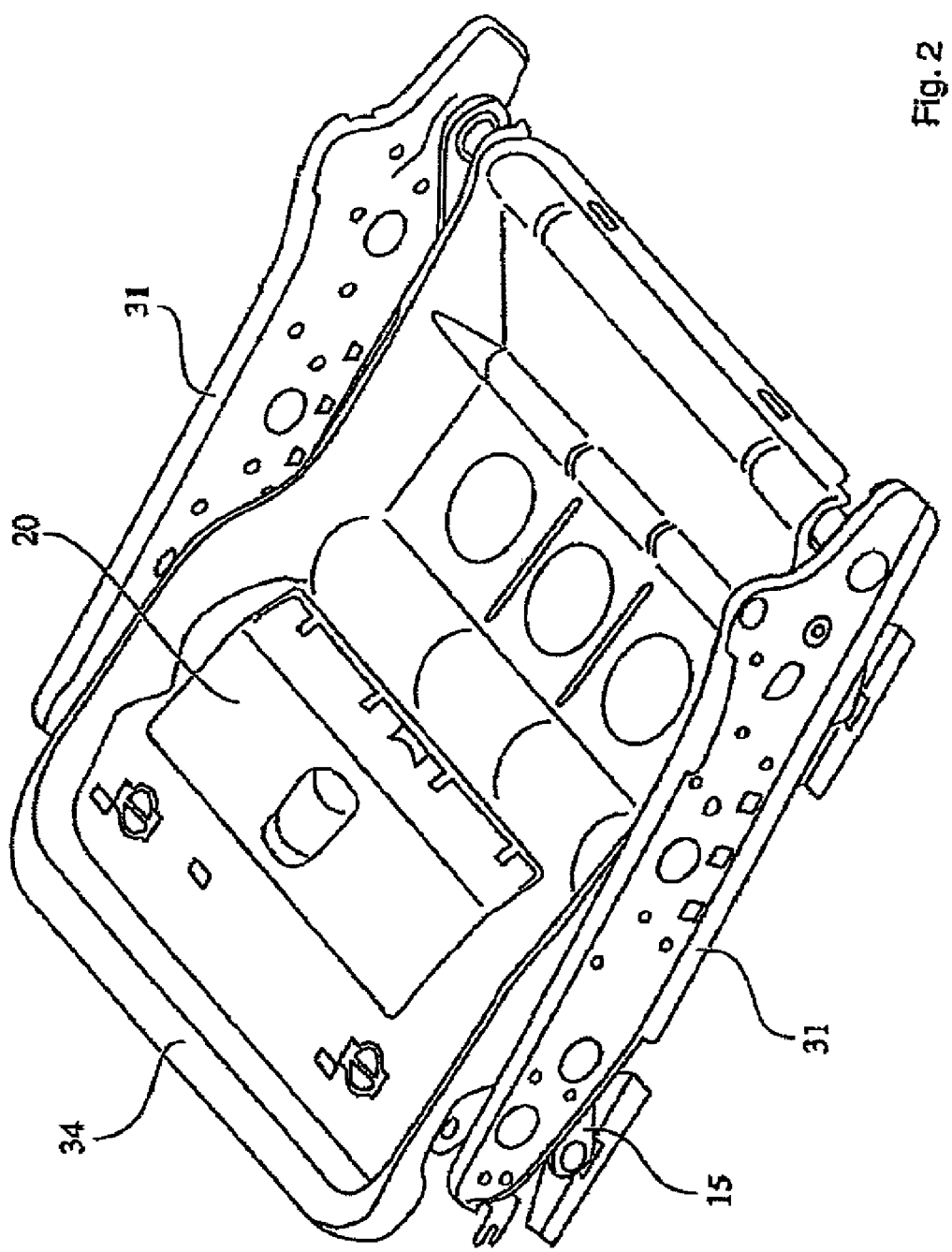

FIG. 2 schematically shows a perspective view of a seat pan or of a padding support of a seat section together with the seat side sections of the seat section of the vehicle seat according to the invention with a view of the restraint device according to the invention.

Figure 4:
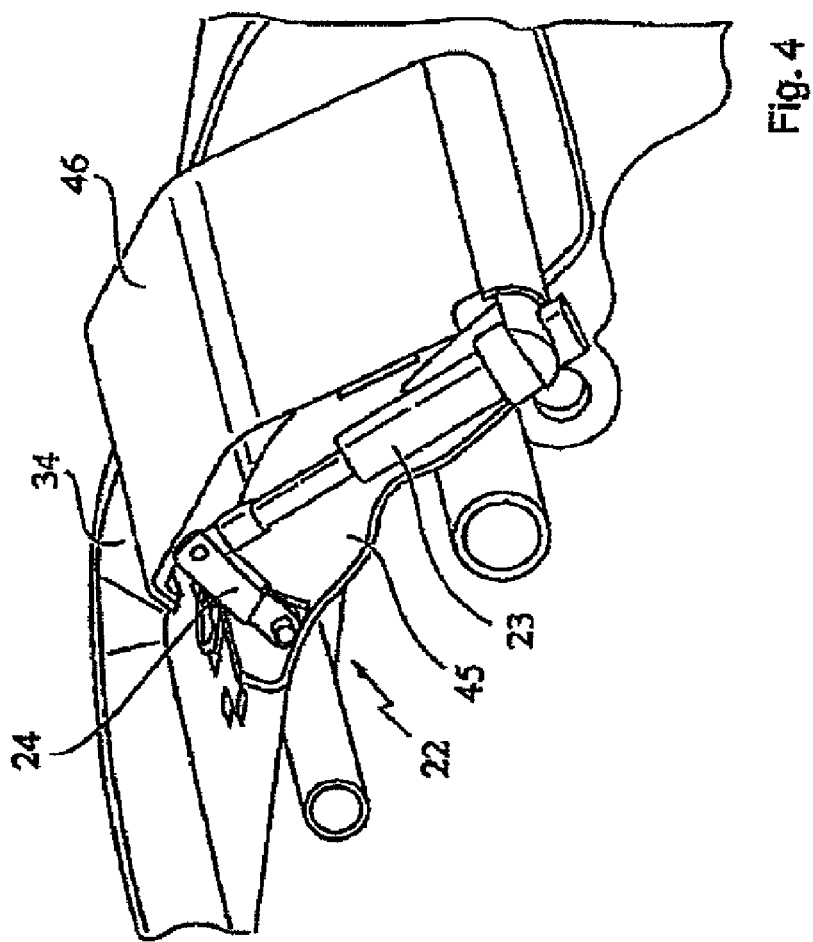
Figure 3:
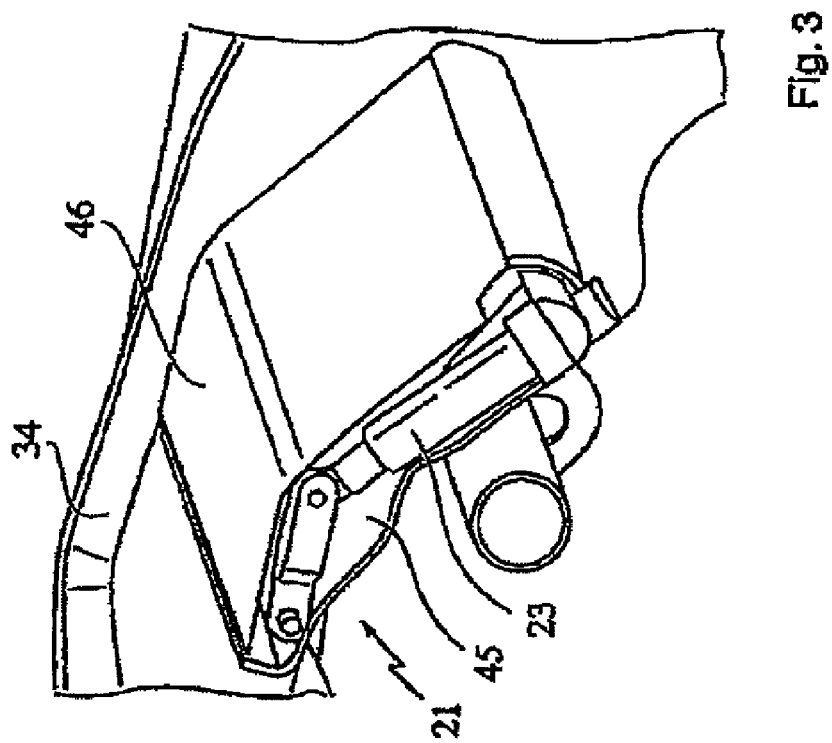

FIGS. 3 and 4 schematically show in perspective view a seat pan or a padding support of a vehicle seat according to the invention with an embodiment of the restraint device in its inactive position (FIG. 3) or in its active position (FIG. 4).

Figure 4A:
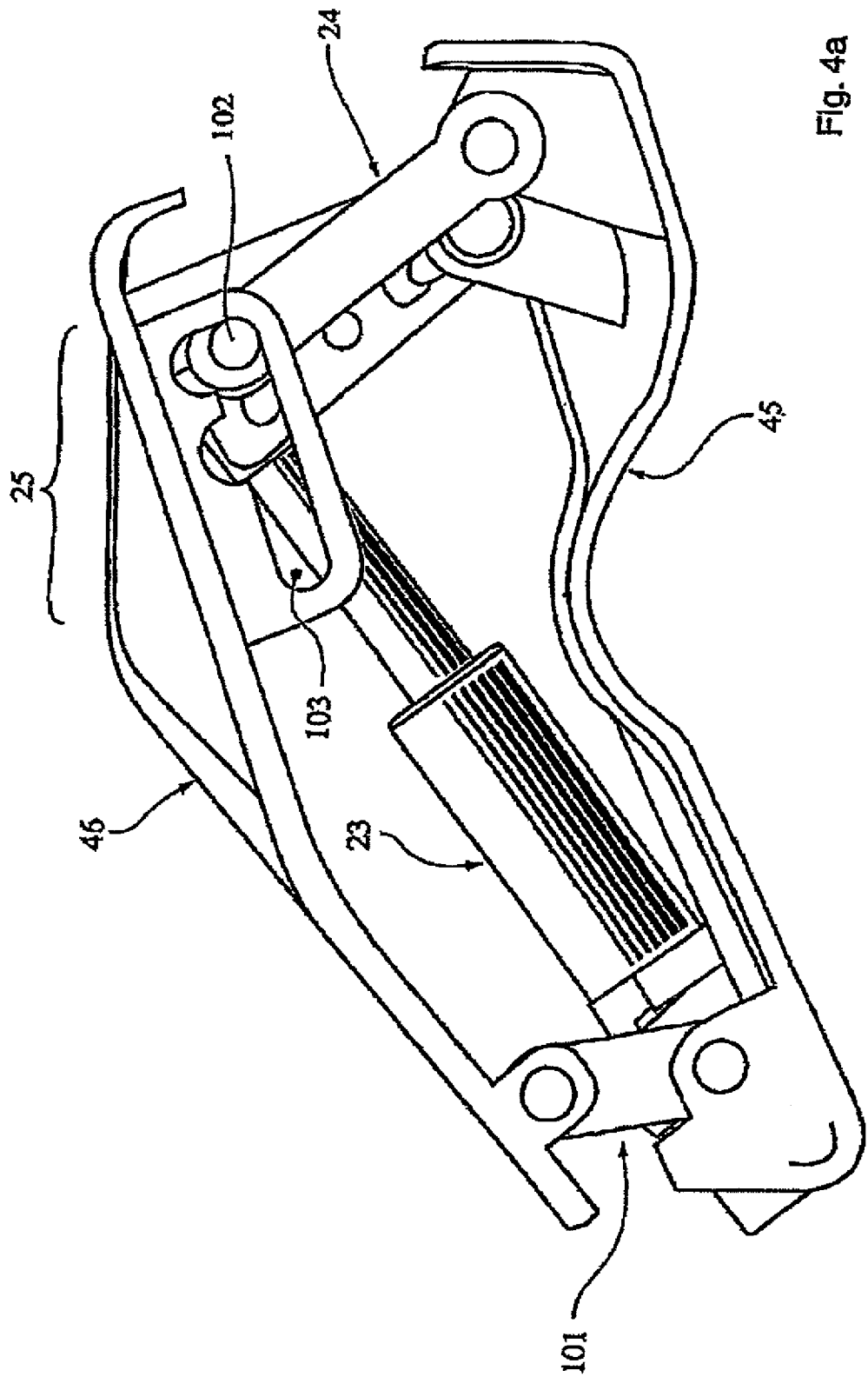
Figure 4C:
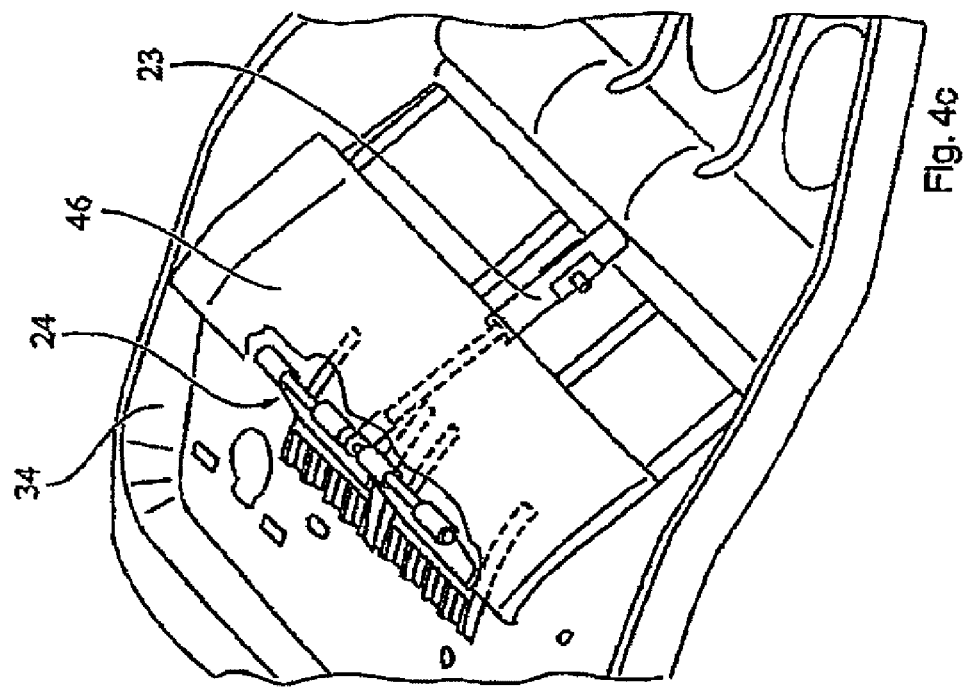
Figure 4B:
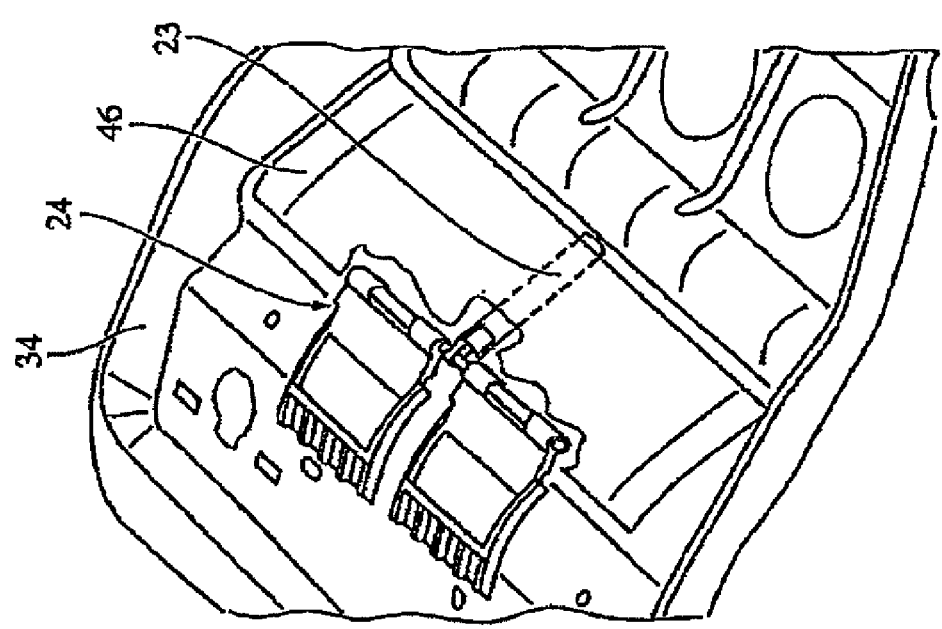

FIGS. 4a, 4b and 4c shows embodiment variants of the restraint device in side view or in perspective view.

Figure 5:
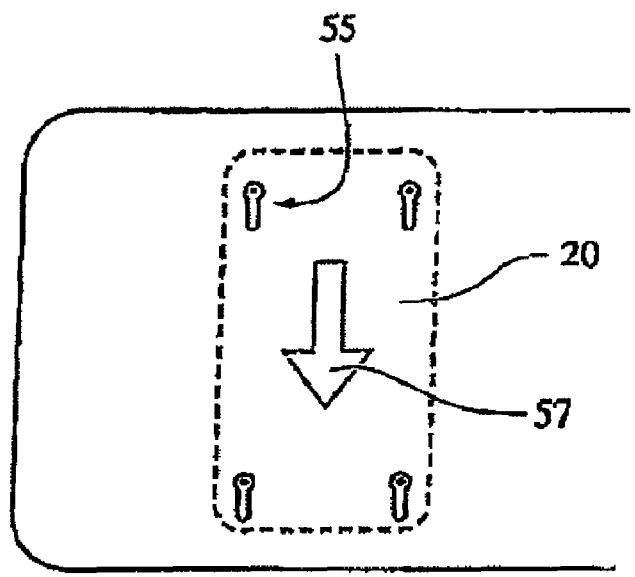
Figure 7:
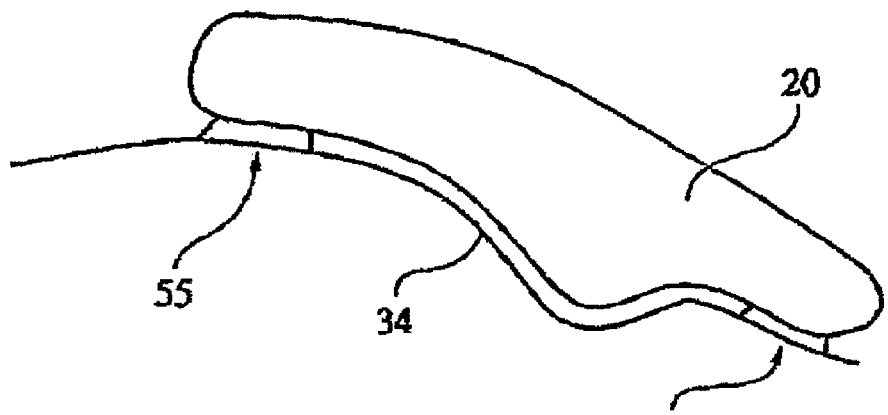

FIGS. 5 and 7 schematically show in top view and, respectively, in side view different embodiments of a fastening of the restraint device according to the invention to the padding support.

Figure 6:
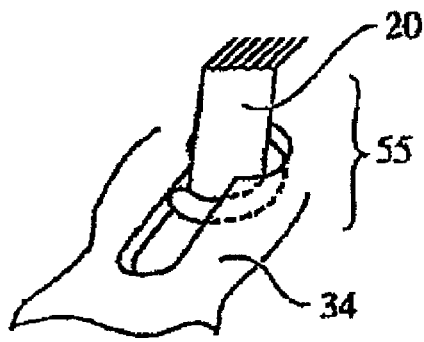

FIG. 6 shows a detail of the connection of the restraint device according to the invention to the padding support.

FIG. 8 schematically shows in side view a detail of the restraint device according to the invention with a further embodiment of a positioning element.

FIGS. 9a, 9b, 9c, 9d, 9e, 9f, 9g, 9h, 9i, 9j, 9k and 9l show embodiment variants of the restraint device in perspective view.

In FIG. 1 (in the left-hand part of the figure), a side view of a vehicle seat 10 according to the invention is schematically shown. The vehicle seat 10 comprises a seat section 30 and also as a rule a back section which is not provided with a designation. According to the invention, the seat section 30 especially has a frame-like structure with at least two seat side sections 31 on the sides. Inside this frame-like structure the seat section 30 has a seat pan 34 or a padding support 34. A padding 33 or a seat cushion 33 is connected to the seat pan 34 or to the padding support 34. The seat section 30 is connected to the floor sub-assembly 16 of the vehicle interior or to the body structure 16 of the vehicle by means of a seat substructure 15. By means of the seat substructure 15 it can be provided according to the invention that the complete vehicle seat 10 is connected in a longitudinally adjustable and/or vertically adjustable and/or inclinably adjustable manner. For this purpose, in the left-hand part of FIG. 1 the seat substructure 15 is shown as outlined links which by rotating or pivoting can bring about a corresponding seat setting. The padding 33 has a seat surface 32 upon which a user of the vehicle seat 10, or an occupant of the vehicle, or a passenger can be seated. According to the invention, it is provided in an especially preferred manner that the seat pan 34 or the padding support 34 together with the padding 33 and the seat surface 32 is provided in a vertically and/or inclinably adjustable manner in relation to the rest of the seat section 30.

The seat section 30 of the vehicle seat 10 according to the invention for example can be provided as a two-times, or four-times, or six-times, or eight-times, or multiply adjustable substructure, as a result of which for example the seat height and/or the seat inclination and/or the seat longitudinal adjustment and/or the seat length setting (thigh support length) can be set. The padding support is shown in FIG. 1 largely as a separate and one-piece seat pan 34 or as a corresponding padding support 34, but can also be provided as a split padding support 34 or a corresponding seat pan 34, as can be seen with reference to the examples of embodiment variants of a padding support 34 which are shown in FIGS. 1a and 1b. A single structural component or a multiplicity of structural components of the seat section are especially understood as a padding support, which are at least adjacent to a padding of the seat or are provided in the proximity of such a padding, approximately at a maximum distance of 10 mm from such a padding, and wherein such a padding is carried, or supported or retained, by the padding support or by its components. As a padding support, in this case for example a continuous padding support (cushion pan or seat pan) (FIG. 1), or a split seat pan, or split seat bucket (FIG. 1a), are a possibility, or even structural elements such as tubular or open stiffening elements (FIG. 1b) as part of the padding support.

According to the invention, a restraint device 20 is arranged between the padding support 34 and the seat surface 32, by means of which a submarining of the user of the vehicle seat 10 in the case of an accident-induced deceleration can be avoided or reduced. The restraint device 20 is provided as an active anti-submarining device and according to the invention is especially preferably designed as a so-called add-on element which can be selectively integrated into the vehicle seat 10 or not (depending upon equipping wishes of the customer or the specifications of the manufacturer). Such an active anti-submarining device component can offer an essential contribution to the improvement of occupant protection in the case of a head-on crash. The unit can preferably be installed as an add-on element in almost all front seats and also rear seats. In this case, the restraint device 20 can be especially preferably integrated into the vehicle seat 10 in a so-called JIT workshop (just-in-time workshop), i.e. in comparatively close proximity to the final assembly of the vehicle or of the complete seat module, by only a fastening of the restraint device 20 on the padding support 34 being carried out, for example via a known fastening technique such as clipping, screwing or riveting. In this case, it is especially advantageous that preferably no welding operations whatsoever arise and also no modifications to structural components of the seat section 30 at all are necessary. Furthermore, according to the invention it is especially advantageous that an identical seat pan 34 or an identical padding support 34 can be used both for a vehicle seat 10 with the restraint device 20 and for a vehicle seat 10 without the restraint device 20. As a result of this, the production costs for such vehicle seats 10 can be significantly reduced or the logistical additional expense for a flexible use of the restraint device 20 on any such vehicle seats is greatly reduced.

In the right-hand part of FIG. 1, a perspective view of a seat pan 34 or of a padding support 34 of a seat section 30 of a vehicle seat 10 according to the invention is schematically shown, with a partially sectioned view of a restraint device 20 according to the invention.

FIG. 2 schematically shows a perspective view of a seat pan 34 or of a padding support 34 of a seat section 30 together with the seat side sections 31 of the seat section 30 of the vehicle seat 10 according to the invention, with a view of the restraint device 20 according to the invention. Also, a part of the seat substructure 15, which in this case is designed as an adjusting linkage for height adjustment and/or inclination adjustment of the vehicle seat 10 and is connected to the seat side sections 31, is apparent from FIG. 2.

FIGS. 3 and 4 show schematically and sectioned in perspective view the seat pan 34 of the vehicle seat 10 according to the invention with an embodiment of the restraint device 20 in its inactive position 21 (FIG. 3) or in its active position 22 (FIG. 4). It is apparent that in the embodiment of the restraint device 20 which is shown this has a housing consisting of an upper shell 46 and a lower shell 45. The housing of the restraint device 20 for example can comprise a steel material, an aluminum material, a magnesium material, a plastic material, or a combination of such materials. It is also apparent that in the active position 22 (FIG. 4) the upper shell 46, by means of an actuating means 23, is extended upwards, i.e. towards the seat surface 32 (which, however, is not shown in FIG. 4). As a result of this, the pelvic bone (or the ischium hump), which is not shown, of a seat user experiences a greater resistance particularly at an earlier point in time in the case of a head-on collision so that a submarining of the pelvis or of the hips of the user (forward displacement (displacement in the X-direction) of the so-called H-point or hip-point) can be avoided or its likelihood or extent significantly reduced. As a result of this, knee airbags which are preferably arranged in the dashboard and/or measures for belt tightening can advantageously be dispensed with or reduced. According to the invention, this can be especially advantageous particularly for 3-door vehicles.

For the positioning of the upper shell 46 of the restraint device 20 this comprises a positioning element 24, which in FIGS. 3 and 4 is shown only as a lever, which is driven by the actuating means 23. In this embodiment of the restraint device 20 the positioning element 24, during the movement between the inactive position 21 of the restraint device 20 and the active position 22 of the restraint device 20, is rotated or pivoted around an essentially horizontal rotational axis (extending parallel to the seat surface 32). As a result of this, the positioning element 24 is adjusted from a retracted position 21' which corresponds to the inactive position 21 of the restraint device 20 into an extended position 22' which corresponds to the active position 22 of the restraint device 20 so that the upper shell 46 is extended and, as a result of this, according to the invention a relatively large impact surface for the pelvic region of a user in an accident situation is provided. An alternative embodiment of the positioning element 24 is an essentially plate-form configuration of the positioning element 24. A positioning element 24 which extends in an essentially flat manner corresponds to an essentially plate-form configuration of the positioning element 24, wherein such an element for example is at least twice as long (as a rule oriented approximately in the Y-direction) as it is wide (as a rule oriented approximately in the X-direction in its inactive position), and has a depth of at most a third of its width. Alternatively to such an essentially plate-form element as a positioning element, it can also be provided according to the invention that a tube with a plate welded on or another structural element of the restraint device 20 serves as a positioning element 24.

The positioning element 24, according to the invention in the exemplary embodiment according to FIGS. 3 and 4, is rotatably or pivotably connected to the lower shell 45 or connected directly to the padding support 34. This last-mentioned alternative connection of the positioning element 24 is especially advantageous when the lower shell 45 is not present. The connection of the positioning element 24 to the lower shell 45 and/or to the padding support 34 can especially be provided by means of one, or by means of two, or by means of three bearing points, or even by means of more than three bearing points. Two bearing points are advantageously provided on the lateral ends of the positioning element 24 (in the Y-direction).

According to the invention, the positioning element 24 and/or the upper section 46 can preferably have a plurality of material zones for bringing about a deformation behavior or an energy dissipation behavior. In this connection, different material zones in particular have a different deformation behavior. Alternatively or cumulatively, the positioning element 24 and/or the upper section 46 is provided to be at least partially reversibly deformable, wherein the positioning element 24 preferably has a shock absorber or a gas-pressure damper or a plurality of such elements. As a result, a different deformation behavior can be realized for accident situations of differing severity or for different forces to be transmitted between the user of the vehicle seat and the vehicle seat.

Alternatively to a positioning element 24 which is rotatable around an essentially horizontal rotational axis, it is also possible according to the invention, and schematically shown in FIG. 8 based on an alternative embodiment of the positioning element, that the positioning element 24 is rotatable around an essentially vertical rotational axis (essentially perpendicularly vertical on the seat surface 32), or is rotatable at least in parts. In this case, the positioning element 24 for example has two reciprocating pistons which are especially cup-like in design and have a spiral pin-and-slot guide and also are rotatable relative to one another and during a rotation execute an axial extending movement along for example the common center axis. Alternatively to a rotation around a common center axis an eccentric rotation of the one reciprocating piston relative to the reciprocating piston or relative to another reciprocating piston can be also be provided. As a result of this, the installation space which is required for the restraint device 20 and also the weight can be reduced. Locking of the positioning element 24 in the extended position can be realized via a preferably asymmetrical toothing (as locking means 25) between the two parts which are rotatably arranged in relation to each other. Furthermore, alternatively or cumulatively to the locking of the positioning element in the extended position, an energy dissipation behavior of a positioning element 24 which is provided in this way can be brought about relatively simply by arranging in the central region of the reciprocating pistons which are designed like cups either a shock absorber element, or a gas-pressure damper, or a deformation material such as a metal foam, a honeycomb structure, or a similar material which dissipates energy in the case of a deformation. In the case of the third embodiment of the positioning element 24, two or more reciprocating piston units can also be provided.

Alternative embodiment variants of the restraint device 20 are shown in FIGS. 4a, 4b and 4c, and also in FIGS. 9a, 9b, 9c, 9d, 9e, 9f, 9g, 9h, 9i, 9j, 9k and 9l, in side view or in perspective view as the case may be.

In FIG. 4a, a variant of the restraint device 20 with a variable connection of the upper section 46 is shown in side view. The variable connection of the upper section 46 of the restraint device 20 is realized in the region facing away from the positioning element 24 by means of a lever 101 which in the initial position (inactive position of the restraint device 20) is adjusted or pivoted towards the positioning element 24. During an activation of the restraint device 20, both the lever 101 and the positioning element 24 are rotated in the opposite rotational direction, wherein the upper section 46 is raised or positioned both in the region of the positioning element 24 (front) and in the region of the padding support 34 which faces away from the positioning element 24, as a result of which a particularly good restraining action is achieved. When activating the restraint device 20, a pin 102 of the positioning element is also moved in the X-direction inside an elongated hole 103. Such an elongated hole 103 can be designed with latching recesses which together with the pin 102 form an example for a locking means 25. In one variant of the restraint device 20, which is not shown, the upper section 46, as in FIG. 4a, is variably connected by means of the lever 101, but the lever in the inactive position is adjusted in a manner in which it is rotated in the direction away from the positioning element 24, and in the region of the positioning element 24 there is no elongated hole 103 but a simply pivotable bearing of the upper section 46 so that the lever 101, the upper section 46 and the positioning element 24 form a four-bar linkage. As a result of this, an optimization of the installation space can be effected. The four-bar linkage kinematics (or corresponding kinematics with variable connection of the upper section 46 corresponding to FIG. 4a), compared with the embodiment which is shown in FIGS. 3 and 4, has the advantage that the upper shell 46 of the housing of the restraint device 20 is also raised in the rear region. This can contribute to an improved restraining functionality. Such four-bar linkage kinematics (or corresponding kinematics with variable connection of the upper section 46 corresponding to FIG. 4a) according to the invention can be arranged both parallel to the direction of travel and transversely to it, or even diagonally to it.

In FIGS. 4b (inactive position) and 4c (active position), a further variant of the restraint device 20, with the upper section 46, which in the case of this variant is linearly movable essentially in only outlined linear guides and which during its linear or at least essentially linear movement positions the positioning element 24, is shown in perspective view. In this case, the upper section 46 is driven by the actuating means 23, which for example is provided as a helical spring, or another form of actuating means 23 is provided, for example a pyrotechnically operating linear actuator.

The actuating means 23 can preferably be designed according to the invention as a pyrotechnic unit, or as a pyrotechnic actuator, preferably a linear actuator. According to the invention, however, it is alternatively or cumulatively also possible that the actuating means 23 is designed as a spring-preloaded element (with mechanically stored actuating energy), or is designed as an electromagnetic unit. In this case, it is especially advantageously provided according to the invention that the effective direction of the actuating means 23, despite the relatively close arrangement of the actuating means 23 in relation to the user of the vehicle seat 10, at no time is directed towards the user, or to sensitive body parts of the user (such as the torso or the pelvic region). As a result of this, the risk of injury, for example in the case of a material defect, can be significantly reduced. The effective direction of the actuating means 23 can be provided according to the invention either essentially parallel to the direction of the vehicle or else be established transversely to it, or even be established diagonally to it.

According to the invention, a locking means (not illustrated) can be fastened to the positioning element 24, in particular to the upper end thereof. Such a locking means is preferably provided, according to the invention, to ensure a good protection function of the restraint device 20 such that during an actuation of the actuating means 23 the system is immediately locked against a movement back into the inactive position 21 by means of the locking means. As a result of this, a maximum possible protection action in all conceivable situations is achieved even when the actual fully extended end position of the restraint device 20 is not reached.

According to the present invention, the restraint device 20 is arranged between the padding support 34 and the padding 33 and also at a distance from the seat side sections 31, and the restraint device 20 is fastened exclusively to the padding support 33. As a result of this, it is advantageously possible that the restraint device 20 can be fitted to the padding support 34 particularly rapidly and simply.

Figure 9A:
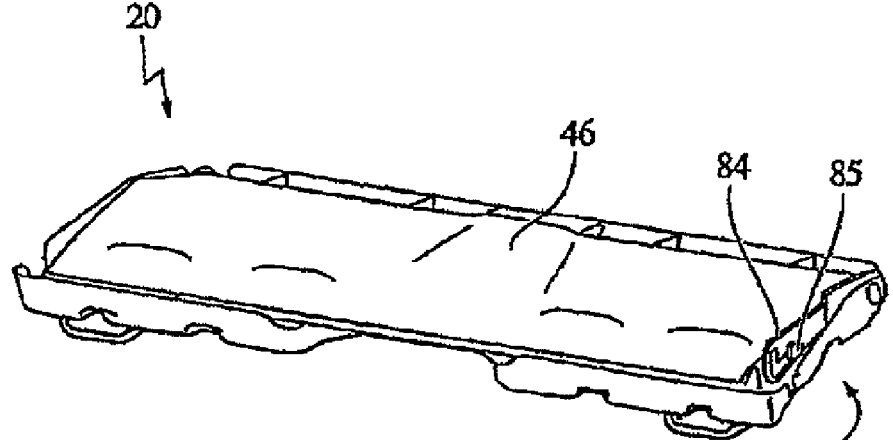
Figure 9B:
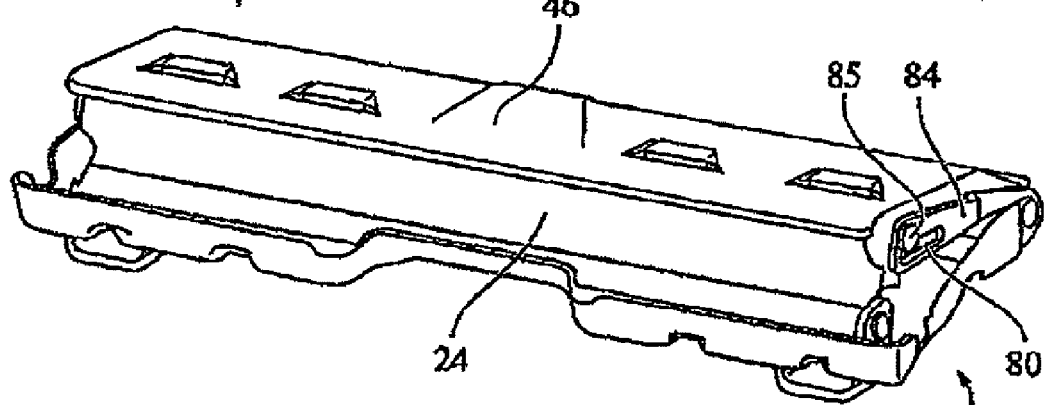
Figure 9C:
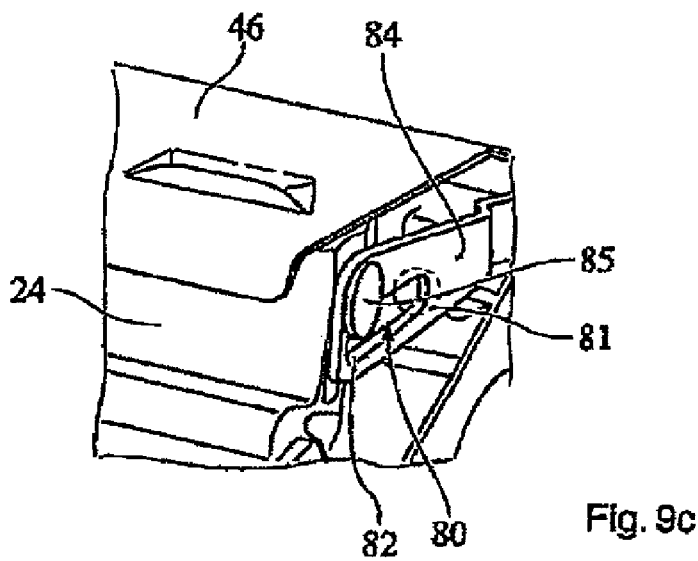
Figure 9D:
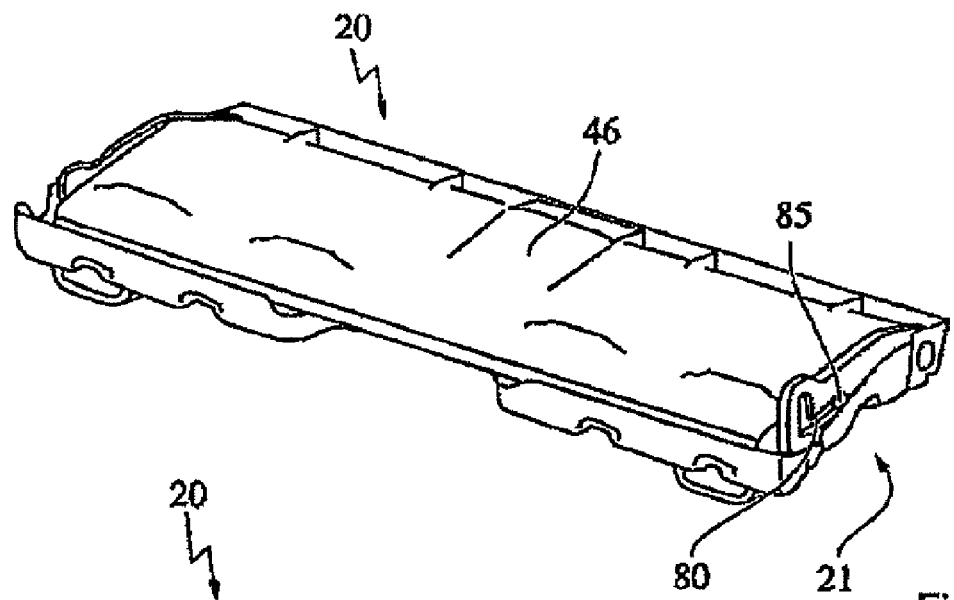
Figure 9E:
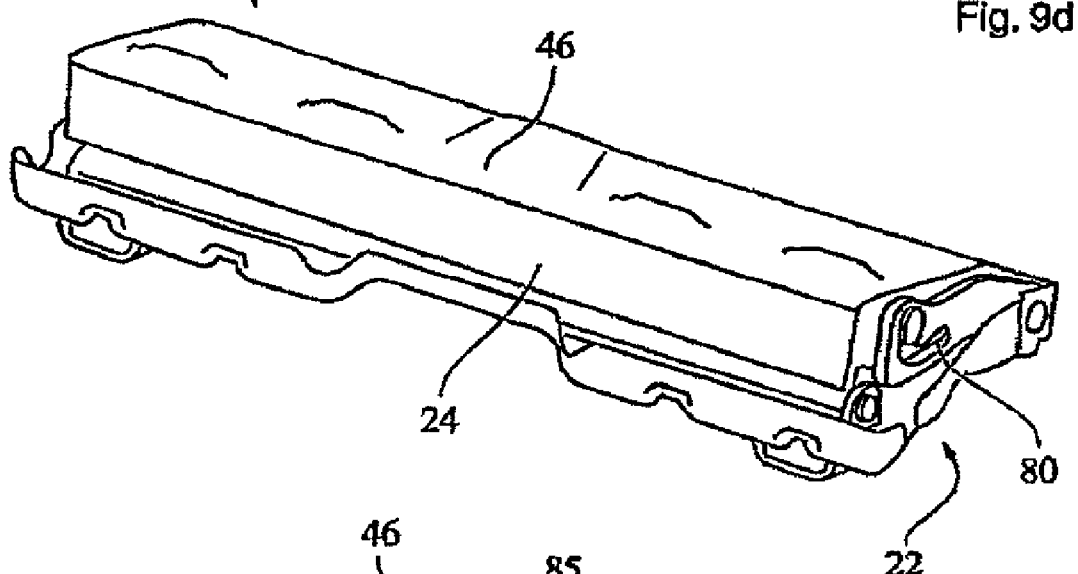
Figure 9F:
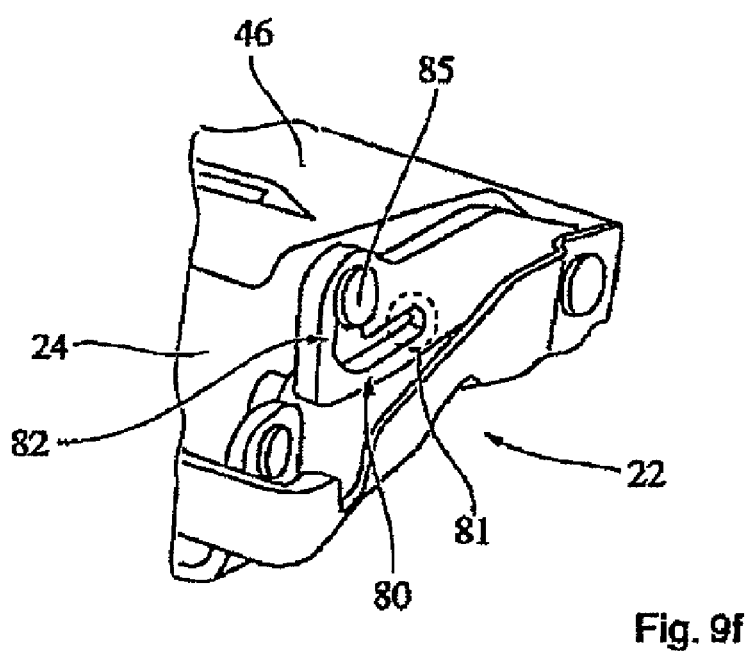

In FIGS. 9a, 9b, 9c, 9d, 9e and 9f, two further variants of the restraint device 20 in the active position (FIGS. 9b, 9c, 9e and 9f), or in the inactive position (FIGS. 9a and 9d), are shown in perspective view. In this case, a slot 80 is arranged in a locking lever 84 which is arranged at the side. The slot 80 has a starting section 81 and an end section 82. A bolt 85, which is movable with the positioning element 24, engages in the slot 80 and during a movement into the active position of the restraint device 20 is moved along the slot 80 from the starting section 81 in the direction towards to the end section 82. The shape of the slot 80 is now configured in such a way that a reverse movement of the positioning element 24 or of the bolt 85 at least in the (fully) activated position or active position 22 of the restraint device 20 is prevented. The difference between the embodiment variant which is shown in FIGS. 9a, 9b and 9c and the embodiment variant which is shown in FIGS. 9d, 9e and 9f is based essentially in the shape of the slot 80, wherein the embodiment variant according to FIGS. 9a, 9b and 9c has a more bent shape of the slot 80 while the embodiment variant according to FIGS. 9d, 9e and 9f has a more curved shape of the slot 80. The locking lever 84 in this case can be pretensioned or spring-preloaded in the direction of its position which corresponds to the inactive position.

Figure 9G:
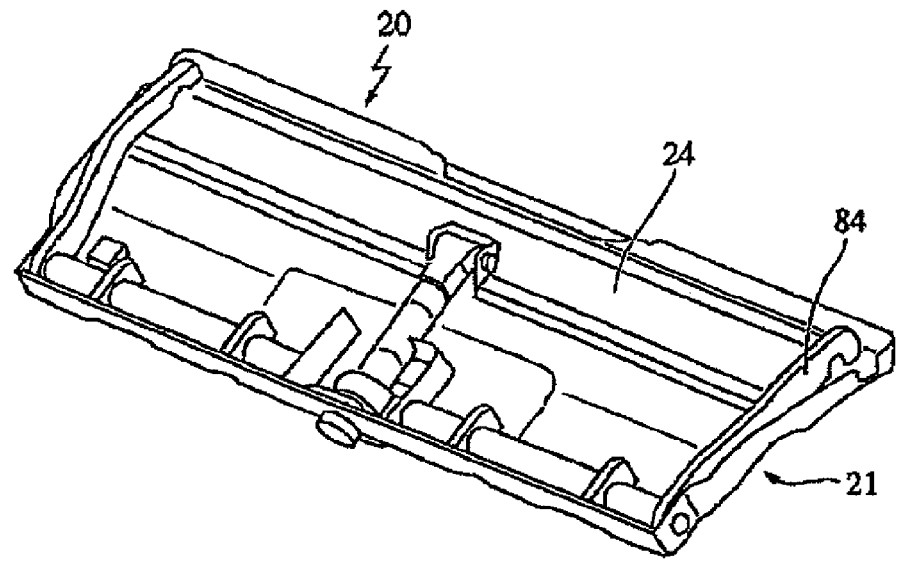
Figure 9H:
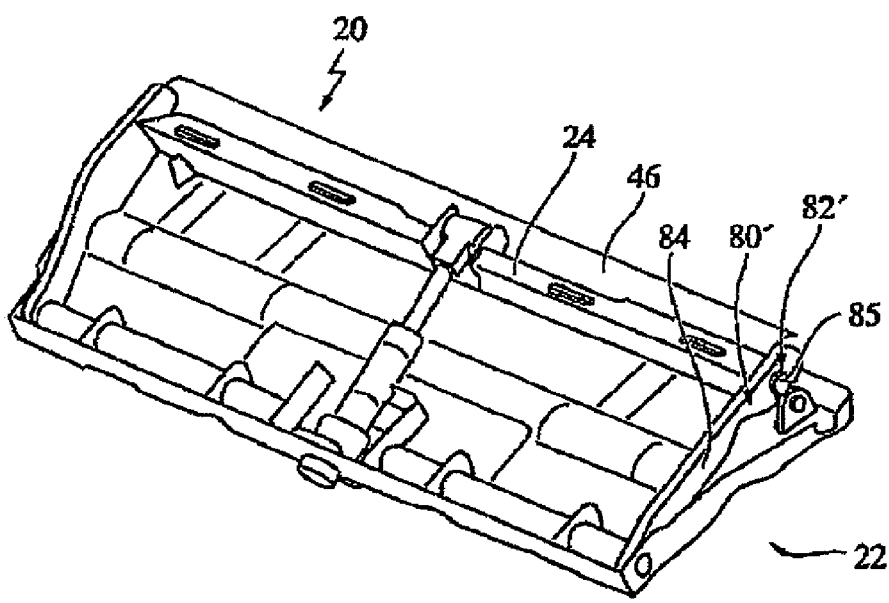

According to a further embodiment variant of the locking means 25, which is shown in FIGS. 9g (inactive position) and 9h (active position), instead of the slot 80 (according to the previously described embodiment variant) an operating cam 80', also with a starting section and an end section 82' for the bolt 85, is provided, wherein the operating cam has a recess in the end section in such a way that the bolt 85, which is moved with the positioning element 24, can also no longer be moved back into the starting section, or such a reverse movement is highly improbable, on account of the force ratios which exist in an accident situation. The locking lever 84 in this case can also be pretensioned or spring-preloaded in the direction of its position which corresponds to the inactive position.

Figure 9I:
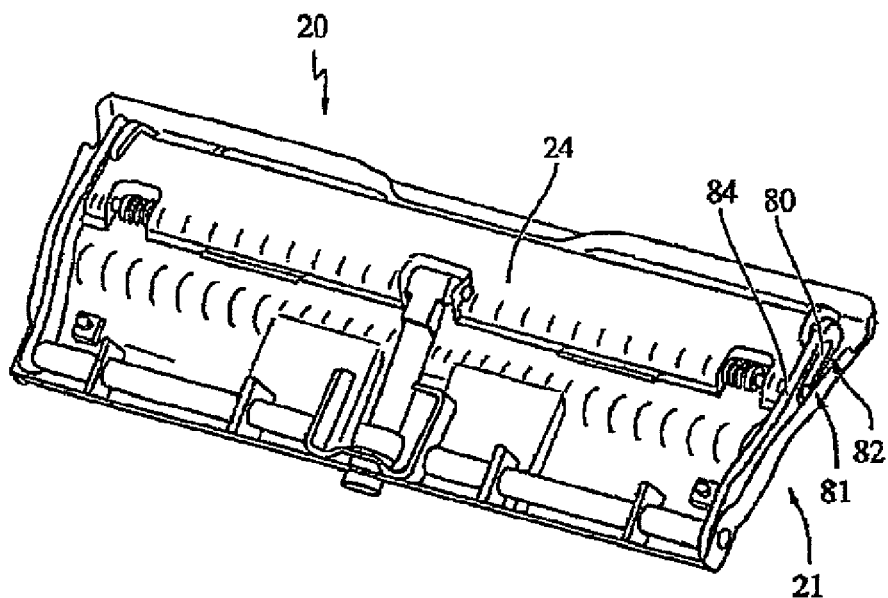
Figure 9J:
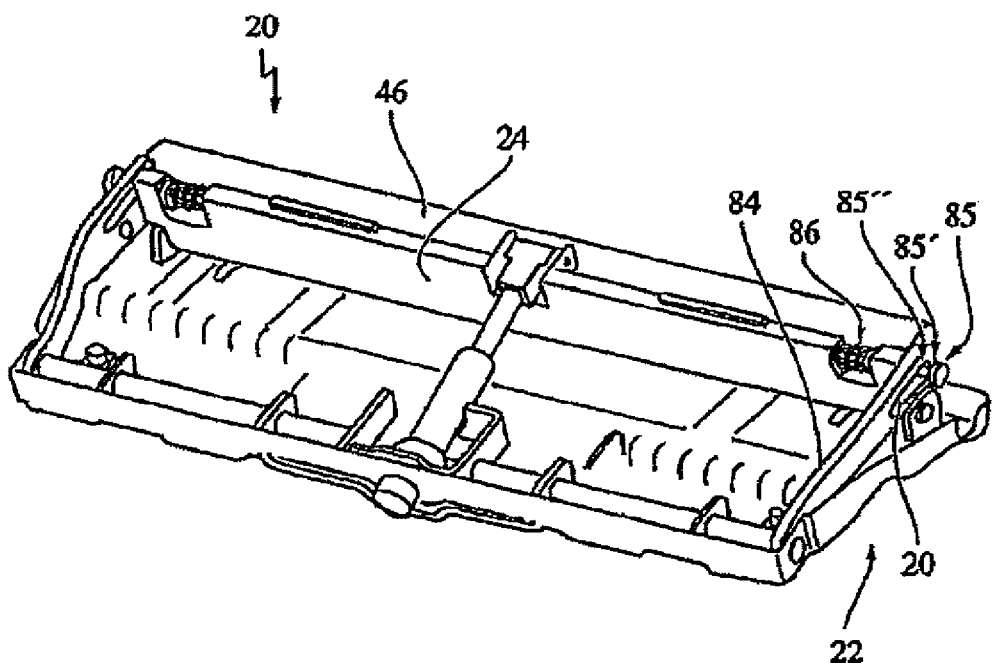

According to a further embodiment variant of the locking means 25, which is shown in FIGS. 9i (inactive position) and 9j (active position), the slot 80 is formed with a starting section 81 which has a reduced clear opening, and an end section 82 which has an enlarged clear opening, in such a way that the bolt 85 has a smaller diameter in a first axial section 85' and interacts with the starting section 81, and that the bolt 85, upon reaching the end section 82 of the slot 80 (which is to be carried out during a movement of the positioning element 24 in the direction of the active position 22), is pressed with a second axial section 85" of the bolt, which has a larger diameter, into the end section 82 on account of an axial spring-pretensioning of the bolt due to a spring element 86.

Figure 9K:
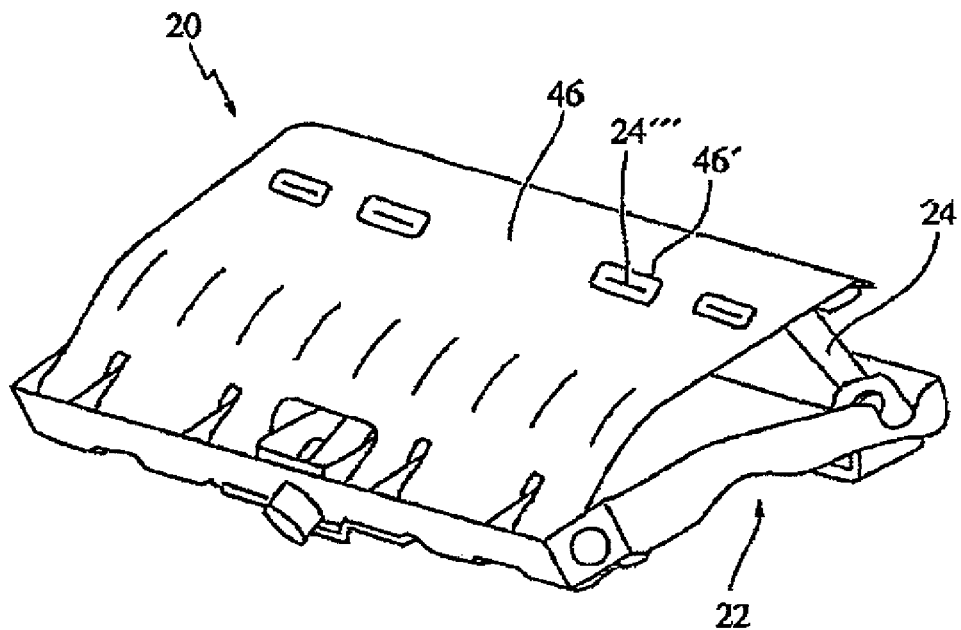
Figure 9L:
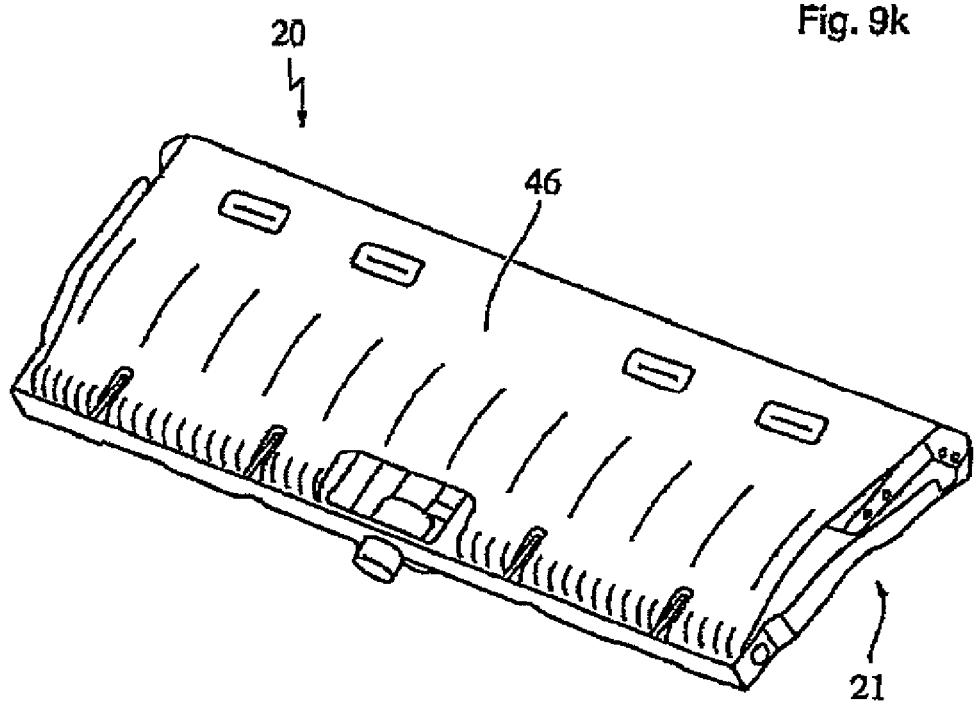

According to a further embodiment variant of the locking means 25, which is shown in FIGS. 9k (active position) and 9l (inactive position), it is provided that the positioning element 24 interacts with the upper section 46, especially with holes or recesses 46' in the upper section 46, in such a way that upon reaching the active position 22 a reverse movement of the positioning element 24 is prevented. In this case, it is especially provided that the positioning element 24 has locking lugs 24''' for engaging in the recesses 46' of the upper section. Furthermore, it can be additionally provided that the upper section 46 has a stop for limiting the positioning movement of the positioning element 24, for example an adapted flange.

FIGS. 5 and 7 respectively schematically show in top view and in side view an embodiment of a fastening of the restraint device 20 according to the invention to the padding support 34. FIG. 6 shows a detail of the connection of the restraint device 20 according to the invention to the padding support 34.

In the embodiment of the connection of the restraint device 20 according to FIGS. 5 and 6, the restraint device 20 is fastened to the padding support 34 by means of displacement relative thereto. For this purpose, a fastening element 55 comprising, for example, an elongated hole in the form of a keyhole and a guide pin is provided, wherein the guide pin is introduced into the elongated hole and is subsequently displaced by a certain distance corresponding to the arrow 57 in order to fasten together the elements which are to be connected. In the case illustrated in FIGS. 5 and 6, the lower side, for example, of the lower section 45 of the restraint device 20 is provided with a number of pins which are inserted into corresponding recesses (elongated holes) in the padding support 34 and, after a displacement according to the arrow 57, produce a connection between the padding support 34 and the restraint device 20. Alternatively, it can also be provided that the pins are formed on the padding support 34 and the elongated holes are formed on the restraint device 20. Furthermore, it can alternatively also be provided that a clip connection is used for the fastening.

FIG. 7 schematically shows, in a side illustration of a detail of the padding support 34, the connection of the same to the restraint device 20 in the event of an adhesive bonding connection. In this case, an adhesive (merely indicated between the padding support 34 and the restraint device 20 by the reference number 55 in FIG. 7) is applied either to the padding support 34 or to the restraint device 20 (or else to both) and subsequently positions both with respect to each other. The adhesive bonding connection here may also be an adhesive bonding connection (not illustrated) which, for example, runs substantially in the X direction.

As an alternative, it may also be provided according to the invention that different connecting techniques are combined with one another, for example the embodiment variants according to FIG. 5 or 6 and according to FIG. 7. By this means, it is possible to bring about a particularly good and secure connection between the padding support 34 and the restraint device 20.

According to the invention, further suitable connecting techniques also include welding, in particular laser welding. Furthermore, according to the invention, "cold metal transfer welding" (CMT welding) or else screwing is also suitable.

FIG. 8 schematically shows in side view a detail of the restraint device 20 according to the invention with a positioning element 24 which is at least partially rotatable about a rotational axis which is essentially perpendicularly vertical to the seat surface. In the case of the cup-like cylinder elements which are rotatable spirally relative to each other, a deformation element and/or a shock absorber and/or a spring element (for example in the form of a spiral spring) can be provided in the central region.

In the embodiment of the locking means 25, which is schematically shown in FIG. 8, an asymmetrical toothing 41 is provided between the two telescopically inter-engaging cylinder elements which together form the positioning element 24. In this case, the asymmetrical toothing 41 is designed in such a way that an extending movement of the cylinder elements is possible, but no reverse movement. According to a variant of this embodiment of the locking means 25, which is not shown, it is provided that a pin slot guide, or pin guide track, which is spirally arranged in the region of the circumference of the cylinder elements, in its end section which corresponds to the active position (extended cylinder elements) has a reduced pitch which in the event of a release of the restraint device 20 leads to the prevention of the movement into the inactive position of the restraint device.

LIST OF DESIGNATIONS

10 Vehicle seat
15 Seat substructure
16 Floor sub-assembly
20 Restraint device
21 Inactive position
21' Retracted position
22 Active position
22' Extended position
23 Actuating means
24 Positioning element
25 Locking means
30 Seat section
31 Seat side sections
32 Seat surface
33 Padding/seat cushion
34 Seat pan/padding support/seat bucket
45 Lower shell
46 Upper shell
55 Fastening element
57 Displacement arrow
80 Slot
80' Operating cam
81 Starting section
82 End section of the slot
82' End section of the operating cam
84 Locking lever
85 Bolt
85' First axial section of the bolt (reduced diameter)
85" Second axial section of the bolt (enlarged diameter)

The invention claimed is:

1. A vehicle seat for preventing submarining of a passenger on the vehicle seat in the case of an accident-induced deceleration, comprising:
   a seat section having two seat side sections extending in the longitudinal direction of the vehicle, wherein the two seat side sections support a padding which defines a seat surface;
   a padding support disposed between the two seat side sections which is provided beneath the padding; and
   a restraint device that can be set in a retracted inactive position and in an extended active position, wherein the restraint device is positioned between an upper surface of the padding support and a lower surface of the padding and at a distance from the seat side sections, such that the restraint device is fastened exclusively to the padding support by at least one of pushing, sliding, clipping, or adhesively adhering the restraint device thereto, such that the restraint device is an add-on element which can be selectively integrated into the vehicle seat;
   said restraint device equipped with a reversibly operating actuator, said actuator arranged between the padding support and the padding, or is supported between the padding support and the padding, and operation of the actuator is provided before the existence of an accident-induced deceleration of the vehicle seat;
   said restraint device further equipped with a plate form positioning element which is movable by the actuator; said positioning element adjustable by the actuator from a retracted position which corresponds to the inactive position of the restraint device into an extended position which corresponds to the active position of the restraint device;
   said positioning element providing for a rotation around an essentially horizontally extending axis between the retracted position and the extended position of the positioning element;
   said positioning element rotation around the essentially horizontally extending axis is provided as a rotation in the direction of travel of the vehicle seat wherein a rotation of at least one part of the positioning element around an essentially vertically extending axis is provided between the retracted position and the extended position of the positioning element, and said positioning element is a telescopically extendable positioning element.

2. The vehicle seat of claim 1 wherein the restraint device has a lower section and an upper section and the lower section has fastening elements for connecting the restraint device to the padding support.

3. The vehicle seat of claim 1 wherein the padding support has fastening elements for connecting the restraint device to the padding support.

4. The vehicle seat of claim 1 wherein the restraint device has a locking device that is movable by the movement of the positioning element, wherein the locking device has a slot and a bolt, and the bolt has an axial first section having a smaller diameter, and an axial second section having a larger diameter, and an axial movement of the bolt is provided for bringing about the locking.

5. A vehicle seat having a restraint device for preventing submarining of a passenger on the vehicle seat due to a deceleration of the vehicle comprising:
   a seat section having two seat side sections spaced a predetermined distance apart;
   a padding support disposed between the two side sections;
   a padding defining a seat surface positioned adjacent a padding support surface of the padding support;
   a restraint device arranged between the padding support surface of the padding support and the padding and between the two seat side sections, wherein the restraint device includes a generally planar shell having a free end and a fixed end that rotates about a first axis, a positioning element having a first stationary end that is fastened to the padding support and rotates about a second axis and a second end that is secured to the free end of the shell;

an actuator attached to the second end of the positioning element to rotate the first end of the positioning element about the second axis and rotate the free end of the shell about the first axis to move the padding between an inactive position and an active position, wherein the positioning element is movable by the actuator, and the positioning element can be adjusted by the actuator from a retracted position corresponding to the inactive position of the restraint device into an extended position corresponding to the active position of the restraint device; and a locking device associated with the restraint device, wherein the locking device is movable by means of the movement of the positioning element, and the locking device has a slot and a bolt, and the bolt has an axial first section having a smaller diameter, and an axial second section having a larger diameter, and an axial movement of the bolt is provided for bringing about the locking.

6. The vehicle seat of claim 5 wherein a rotation around an essentially horizontally extending axis is provided between the retracted position and the extended position of the positioning element, the positioning element is a plate-form positioning element.

7. The vehicle seat of claim 5 wherein the padding support has fastening elements for connecting the restraint device to the padding support.

* * * * *